(12) United States Patent
Poulek

(10) Patent No.: US 6,253,632 B1
(45) Date of Patent: Jul. 3, 2001

(54) MOTION TRANSFORMING APPARATUS

(76) Inventor: Vladisklav Poulek, Kaśtanová 1481, 250 01 Brandýs nad Labem (CS)

( * ) Notice: Subject to any disclaimer, the term of this patent is extended or adjusted under 35 U.S.C. 154(b) by 0 days.

(21) Appl. No.: 09/403,883

(22) PCT Filed: Mar. 31, 1998

(86) PCT No.: PCT/CZ98/00016
§ 371 Date: Oct. 26, 1999
§ 102(e) Date: Oct. 26, 1999

(87) PCT Pub. No.: WO98/49464
PCT Pub. Date: Nov. 5, 1998

(30) Foreign Application Priority Data

Apr. 30, 1997 (CS) .................................................... 1318-97

(51) Int. Cl.$^7$ .................................................. F16H 25/20
(52) U.S. Cl. ............................... 74/89.15; 74/424.8 B; 74/99 A
(58) Field of Search ............................. 74/424.8 B, 99 A, 74/89.15, 424.8 R

(56) References Cited

U.S. PATENT DOCUMENTS

| | | | | |
|---|---|---|---|---|
| 2,144,447 | * | 1/1939 | Barnhart | 74/424.8 R |
| 2,818,743 | | 1/1958 | Zatsky | 74/393 |
| 3,121,345 | * | 2/1964 | Zeigler et al. | 92/116 |
| 3,184,214 | * | 5/1965 | King | 74/89.15 X |
| 3,391,722 | * | 7/1968 | Ligh | 74/89 X |
| 4,350,460 | * | 9/1982 | Schmelzer et al. | 464/179 X |
| 4,723,453 | | 2/1988 | Kannapan et al. | 74/89.15 |
| 5,622,078 | * | 4/1997 | Mattson | 74/89.15 |

FOREIGN PATENT DOCUMENTS

| | | |
|---|---|---|
| 1957658 | 11/1970 | (DE) . |
| 3121136 | 12/1982 | (DE) . |
| 0163602 | 12/1985 | (EP) . |
| 0509362 | 10/1992 | (EP) . |
| 2161491 | 7/1973 | (FR) . |
| 857203 | 12/1960 | (GB) . |

* cited by examiner

*Primary Examiner*—Allan D. Herrmann
(74) *Attorney, Agent, or Firm*—Burns, Doane, Swecker & Mathis, L.L.P.

(57) ABSTRACT

A tube motor having an electric motor which is placed in a tube and the electric motor is coupled to a screw transmission including two screws with different pitches and a guide rod, whose driven screw and guide rod are arranged in-line on the common axis and manufactured as a single piece, placed rotatable, axially immovable driven nut and in an immovable guide profile, the electric motor being fixed at one end of said stationary tube and the driven nut being rotatably but axially immovable coupled to the other end of the stationary tube; whereby the pitch of said driven screw is high enough that the whole screw transmission is self-locking with respect to an external torque.

13 Claims, 3 Drawing Sheets

MOTION TRANSFORMING APPARATUS

FIELD OF THE INVENTION

The invention relates to the field of motion transforming devices with electric motor and velocity reducing screw-and-nut transmission, located in a tube.

BACKGROUND OF THE INVENTION

Motion transforming device with screw-and-nut transmission is described for instance in a German Patent DE 3121136. State of the art of motors in a tube and screw-and-nut transmissions is represented by following patents: GB 857,203, DE1 957658, U.S. Pat. No. 2,818,743 a U.S. Pat. No. 4,723,453. Existing motors in a tube use screw transmission where both guide and driving nuts are manufactured by milling of both axial and helical groove on tube and both guide and driving nuts are coaxial.

Disadvantage of such an arrangement is in that it cannot work at high specific torques, related to the cross-section of the transmission. Otherwise, there are motors in a tube used with planetary gearbox, however, they have the same disadvantage.

SUMMARY OF THE INVENTION

The present invention avoids mentioned disadvantages of the prior art.

Motion transforming apparatus transforming an angular motion into an angular function thereof, comprising an electric motor that is placed in a tube and has an output that is coupled to a screw transmission which includes two screws with different pitches and two nuts and a guide mechanism, according to the invention has the output of the electric motor coupled to a driving screw transmission which includes a driving screw and a driving nut cooperating with one another, whereby one of said driving screw and driving nut is rotatably connected to said output and the other end of said driving screw and said driving nut being arranged non-rotatably but axially movable, said non-rotatably but axially movable driving screw or driving nut being drivingly connected to a guide rod so as to impart a non-rotatable but axial motion to said guide rod, said guide rod being linearly guided in a guide mechanism and connected to a driven screw so as to form a single piece therewith, said non-rotatable but axial movable driven screw cooperating with a rotatable but axially immovable driven nut whereby said linear motion-of said guide rod and said driven screw imparts via its pitch in turn a rotational motion to said rotatable but axially immovable driven nut, said electric motor, said driving screw, said driving nut, said guide rod, said driven screw, said driven nut and said guide mechanism being arranged in-line on a common axis in a stationary tube, said electric motor being fixed at one end of said stationary tube and said driven nut being rotatably but axially immovable coupled to the other end of said stationary tube, said driving and driven screw having different pitches, whereby the pitch of said driven screw is high enough that the whole screw transmission is self-locking with respect to an external torque.

In one possible embodiment of the invention, the said guide mechanism serving to linearly guide the said guide rod, is an immovable guide profile fixed to the internal side of the said stationary tube.

In another possible embodiment of the invention, the said guide mechanism is composed of two rotatable wheels, carried on an axle fixed to an end of the said guide rod and perpendicular thereto, said rotatable wheels being linearly movable in an immovable guide profile fixed to the internal side of the said stationary tube.

Arrangement of the motor and the screw transmission according to the invention enables to maximize the torque of the apparatus in relation to given cross-section of the tube, as the guide and driven rod, the guide mechanism and the driven nut can be made just fill-in the cross-section of the tube. The self-locking transmission protects the driving screw and the electric motor against external torque.

The driven screw and the guide rod can be manufactured of a single piece of the same cross-section, e.g. trihedral to octagonal rod and/or of a rod with two- to eight grooves, while the screw can be manufactured on a part of the rod by hot or cold twisting. Manufacturing of driven screw by forming a part of the guide rod is quick and easy.

Use of standard profile rods, especially square, enables to use also standard tools for manufacturing of nuts. It reduces price substantially.

The guide mechanism of the driven screw is a guide profile corresponding to at least trihedral rod placed in it or, for reduction of friction, it is represented by at least two rotatable wheels placed on axles which are fixed at the end of the driven screw perpendicularly to the longitudinal axis of the driven screw, said wheels being placed in the guide profile which is manufactured in the tube co-axially with the longitudinal axis of the driven screw.

The coupling element located at one end of the driving screw enables to compensate misalignment between the driving screw and the guide rod. It enables to increase manufacturing tolerances.

Use of driving ball screws substantially increases mechanical efficiency of the apparatus.

Use of the electric motor with a hollow axle reduces the design length of the apparatus. Use of the electric motor with gearbox enables to increase transmission ratio of the apparatus. Use of the auxiliary output tube on the driven nut enables easy attachment to a driven device.

BRIEF DESCRIPTION OF DRAWINGS

Figures schematically show only examples of the embodiment of the apparatus according to the invention.

DETAILED DESCRIPTION OF THE PREFERRED EMBODIMENT(s)

Figure 1:
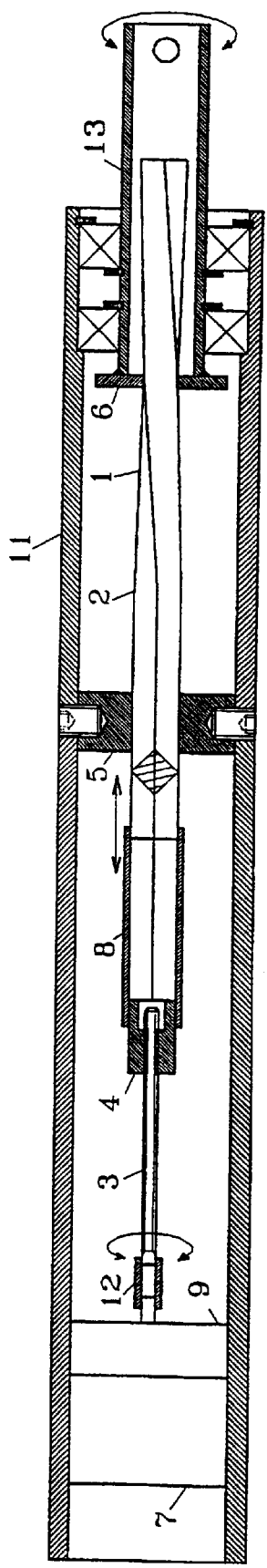
FIG. 1. shows arrangement with a square guide rod, with a driving screw placed in an auxiliary tube and with the guide profile represented by the guide nut.

In FIG. 1, the apparatus comprises electric motor 7, square guide rod 2, screw transmission with two screws and two nuts with different pitches. The driving screw 3 is placed in the auxiliary tube 8. The driven screw 1 and the guide rod 2 are made of single piece so that the twisted part of the guide rod 2 creates the driven screw 1. The driven screw 1 and the guide rod 2 are of the same cross-section and the driving screw 3, the driven screw 1 and the guide rod 2 are placed in-line on a common axis and the driving nut 4, guide profile 5, represented in this case by the sliding nut fixed to the tube 11, and the driven nut 6 are also placed in-line on a common axis. Between the electric motor 7 and the driving screw 3 is placed the gearbox 9. The electric motor 7, driving nut 4, the driving screw 3, guide mechanism 5, the guide rod 2 and the driven nut 6 are placed in the common tube 11. The driving screw 3 is provided by the coupling element 12 for compensation of misalignment. The driven nut 6 is fixed to the output tube 13.

The apparatus works as follows. The driving screw 3 driven by the electric motor 7 shifts, by use of the driving nut 4, the guide rod 2. The driven screw 1 is made on the part of the guide rod 2. As the driven screw 1 moves through the driven nut 6, the linear movement is transformed to the rotational movement. If the external toque is higher than the torque of the motor, the self-locking transmission locks the apparatus.

Range of rotation is approximately 360° in this arrangement.

Figure 2:
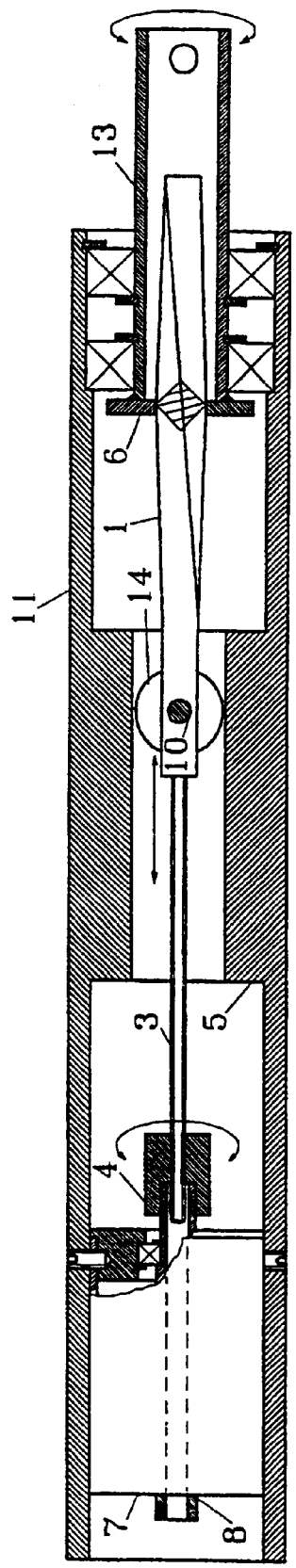
FIG. 2 shows arrangement of the apparatus with square guide rod, with ball screw placed in the hollow axle of the electric motor and with guide mechanism comprising two rotatable wheels.

In FIG. 2, the apparatus comprises the guide mechanism including two rotatable wheels 14, e.g. ball bearings, placed on the axle 10 which is fixed at the end of the driven screw 1 perpendicularly to the longitudinal axis of the driven screw 1, the ball driving screw 3 placed in the hollow axle 8 of the electric motor 7 and the screw transmission with two screws and two nuts with different pitches. The driven screw 1 and the rotatable wheels 14 create one single piece and the driving screw 3, the guide mechanism and the driven screw 1 are placed in-line on a common axis and the driving nut 4, the guide profile 5, and the driven nut 6 are also placed in-line on a common axis. The driven nut 6 is fixed to the output tube 13. The end of the driven screw 1 with the rotatable wheels 14 is placed in the guide profile 5 which is manufactured and fixed in the tube 11 co-axially with the longitudinal axis of the driven screw 1.

The apparatus works the same way as the exemplary embodiment illustrated in FIG. 1.

The driving nut 4 driven by the electric motor 7 shifts, by use of the driving screw 3, the axle 10 of the rotatable wheels 14 in the guide profile 5. The axle 10 with the rotatable wheels 14 is fixed at the end of the driven screw 1. As the driven screw 1 moves through the driven nut 6 the linear movement is transformed to the rotational movement.

Figure 3:
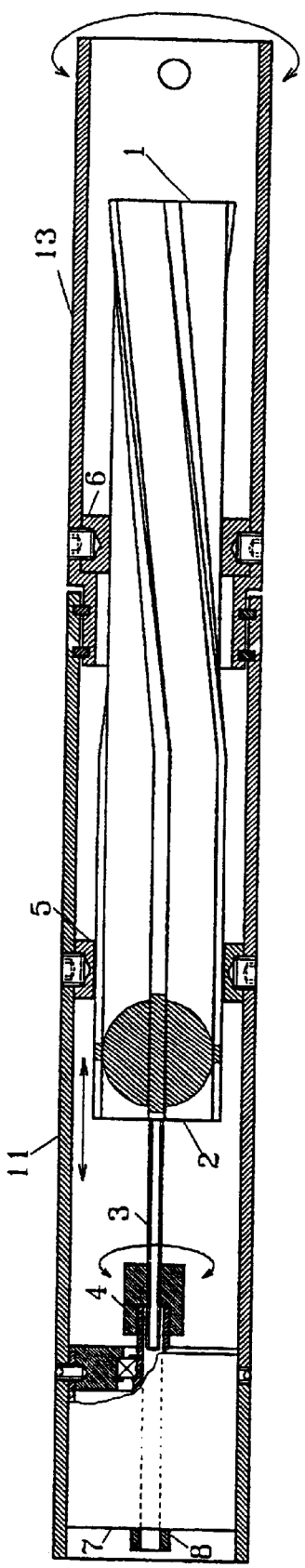
FIG. 3 shows arrangement of the apparatus with four-groove guide rod and with ball screw placed in the hollow axle of the electric motor.

In FIG. 3, the apparatus comprises the four-groove guide rod 2, the ball driving screw 3 placed in the hollow axle 8 of the electric motor 7 and the screw transmission with two screws and two nuts with different pitches. The driven screw 1 and the guide rod 2 are made of single piece so that the twisted part of the guide rod 2 creates the driven screw 1. The driven screw 1 and the guide rod 2 are of the same cross-section and the driving screw 3, the driven screw 1 and the guide rod 2 are placed in-line on a common axis and the driving nut 4, the guide profile 5, and the driven nut 6 are also placed in-line on a common axis. The driven nut 6 is fixed to the output tube 13.

The apparatus works in the same way as the exemplary embodiment illustrated in FIG. 1.

The driving nut 4 driven by the electric motor 7 shifts, by use of the driving screw 3, the guide rod 2. The driven screw 1 is made on the part of the guide rod 2. As the driven screw 1 moves through the driven nut 6 the linear movement is transformed to the rotational movement.

Preceding description of the arrangement of the apparatus shows only some variants of the invention and does not represent all existing variants of the apparatus possible according to the invention. It is possible in the apparatus according to the invention, among other, to interchange the location of the guide nut and rod with driven nut and rod. At least one transmission nut and at least one transmission screw should be made of stainless steel and/or should be provided with sliding film based either on PTFE or on molybdenum disulfide and at least one screw should be provided with trapezoidal thread.

Industrial Applicability

The apparatus according to the invention is applicable in any equipment where high torque limited range movement is needed, e.g. in solar trackers, rotators of antennas, door opening mechanisms etc.

What is claimed is:

1. A motion transforming apparatus transforming an angular motion into an angular function thereof, comprising an electric motor that is placed in a stationary tube and has an output, said output being coupled to a screw drive which includes two screws with different pitches and two nuts and a guide mechanism, the output of the electric motor is coupled to a driving screw transmission which includes a driving screw and a driving nut cooperating with one another, whereby one of said driving screw and driving nut is rotatably connected to said output and the other one of said driving screw and said driving nut being arranged non-rotatably but axially movable; said non-rotatably but axially movable driving screw or driving nut being drivingly connected to a guide rod so as to impart a non-rotatable but axial motion to said guide rod; said guide rod being linearly guided in said guide mechanism and connected to a driven screw so as to form a single piece therewith; said non-rotatable but axial movable driven screw cooperating with a rotatable but axially immovable driven nut whereby said linear motion of said guide rod and said driven screw imparts via its pitch in turn a rotational motion to said rotatable but axially immovable driven nut; said electric motor, said driving screw, said driving nut, said guide rod, said driven screw, said driven nut and said guide mechanism being arranged in-line on a common axis in said stationary tube; said electric motor being fixed at one end of said stationary tube and said driven nut being rotatably but axially immovable coupled to the other end of said stationary tube; said driving and driven screw having the different pitches, whereby the pitch of said driven screw is high enough that the whole screw transmission is self-locking with respect to an external torque.

2. The motion transforming apparatus according to claim 1, wherein the guide mechanism, serving to linearly guide the guide rod, is an immovable guide profile fixed to the internal side of the stationary tube, having an inner hole enabling linear movement of the guide rod in it.

3. The motion transforming apparatus according to claim 1, wherein the guide mechanism comprises at least two rotatable wheels, carried on an axle that is fixed to an end of the driven screw and that is perpendicular thereto, said rotatable wheels being linearly movable in an immovable guide profile fixed to the internal side of the stationary tube.

4. The motion transforming apparatus according to claim 1, wherein the driving screw is provided at one end by a coupling element for compensation of misalignment of the driving screw and the guide rod.

5. The motion transforming apparatus according to claim 1, wherein a gearbox is placed between the electric motor and the driving screw.

6. The motion transforming apparatus according to claim 1, wherein an output tube is co-axially fixed to the driven nut.

7. A motion transforming apparatus transforming an angular motion into an angular function thereof, comprising an electric motor that is placed in a stationary tube and has an output, said output being coupled to a screw drive which includes two screws with different pitches and two nuts and a guide mechanism, the output of the electric motor is coupled to a driving screw transmission which includes a driving screw and a driving nut cooperating with one another, whereby one of said driving screw and driving nut is rotatably connected to said output and the other one of said driving screw and said driving nut being arranged non-rotatably but axially movable; said non-rotatably but axially movable driving screw or driving nut being drivingly connected to a guide rod so as to impart a non-rotatable but axial motion to said guide rod; said guide rod being linearly guided in said guide mechanism and connected to a driven screw so as to form a single piece therewith; said non-rotatable but axial movable driven screw cooperating with a rotatable but axially immovable driven nut whereby said linear motion of said guide rod and said driven screw imparts via its pitch in turn a rotational motion to said rotatable but axially immovable driven nut; said electric motor, said driving screw, said driving nut, said guide rod, said driven screw, said driven nut and said guide mechanism being arranged in-line on a common axis in said stationary tube; said electric motor being fixed at one end of said stationary tube and said driven nut being rotatable but axially immovable coupled to the other end of said stationary tube; said driving and driven screw having the different pitches, whereby the pitch of said driven screw is high enough that the whole screw transmission is self-locking with respect to an external torque.

8. The motion transforming apparatus according to claim 7, wherein the driving screw is a ball screw.

9. The motion transforming apparatus according to claim 7, wherein a gearbox is placed between the electric motor and the driving screw.

10. The motion transforming apparatus according to claim 7, wherein an output tube is co-axially fixed to the driven nut.

11. A motion transforming apparatus transforming an angular motion into an angular function thereof, comprising an electric motor that is placed in a stationary tube and has an output, said output being coupled to a screw drive which includes two screws with different pitches and two nuts and a guide mechanism, the output of the electric motor is coupled to a driving screw transmission which includes a driving screw and a driving nut cooperating with one another, whereby one of said driving screw and driving nut is rotatable connected to said output and the other one of said driving screw and said driving nut being arranged non-rotatably but axially movable; said non-rotatably but axially movable driving screw or driving nut being drivingly connected to a guide rod so as to impart a non-rotatable but axial motion to said guide rod; said guide rod being linearly guided in said guide mechanism and connected to a driven screw so as to form a single piece therewith; said non-rotatable but axial movable driven screw cooperating with a rotatable but axially immovable driven nut whereby said linear motion of said guide rod and said driven screw imparts via its pitch in turn a rotational motion to said rotatable but axially immovable driven nut; said electric motor, said driving screw, said driving nut, said guide rod, said driven screw, said driven nut and said guide mechanism being arranged in-line on a common axis in said stationary tube; said electric motor being fixed at one end of said stationary tube and said driven nut being rotatably but axially immovable coupled to the other end of said stationary tube; said driving and driven screw having the different pitches, whereby the pitch of said driven screw is high enough that the whole screw transmission is self-locking with respect to an external toque.

12. The motion transforming apparatus according to claim 11, wherein a gearbox is placed between the electric motor and the driving screw.

13. The motion transforming apparatus according to claim 11, wherein an output tube is co-axially fixed to the driven nut.

\* \* \* \* \*